United States Patent [19]

Hoover et al.

[11] Patent Number: 5,608,026

[45] Date of Patent: Mar. 4, 1997

[54] TERPOLYMER HAVING ALIPHATIC POLYESTER, POLYSILOXANE AND POLYCARBONATE

[75] Inventors: James F. Hoover; Luca P. Fontana, both of Evansville, Ind.

[73] Assignee: General Electric Company, Pittsfield, Mass.

[21] Appl. No.: 204,699

[22] Filed: Mar. 2, 1994

Related U.S. Application Data

[63] Continuation of Ser. No. 724,018, Jul. 1, 1991, abandoned.

[51] Int. Cl.$^6$ .................... C08G 77/445; C08G 77/448
[52] U.S. Cl. .................................. 528/26; 528/29
[58] Field of Search ................ 528/26, 29; 525/439, 525/446, 474, 464

[56] References Cited

U.S. PATENT DOCUMENTS

| | | | |
|---|---|---|---|
| 3,207,814 | 9/1965 | Goldberg | 528/26 |
| 3,419,634 | 12/1968 | Vaughn | 528/29 |
| 3,994,988 | 11/1976 | Laurin | 528/26 |
| 4,330,662 | 5/1982 | Bales | 528/176 |
| 4,681,922 | 7/1987 | Schmidt et al. | 525/474 |
| 4,945,148 | 7/1990 | Rich et al. | 528/26 |
| 5,032,661 | 7/1991 | Serini et al. | 528/21 |

FOREIGN PATENT DOCUMENTS 0416376  3/1991  European Pat. Off. .

*Primary Examiner*—Ralph H. Dean

[57] ABSTRACT

Block condensation copolymers with improved processability, low temperature impact strength and solvent resistance have a polysiloxane block such as

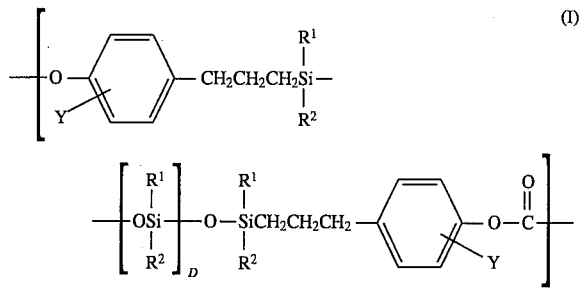

where D is about 10 to 120, and a polycarbonate-aliphatic polyester block. Such polymers are made by an interfacial reaction of phosgene with a bisphenol, a phenol-terminated siloxane, and an aliphatic dicarboxylic acid salt.

9 Claims, No Drawings

5,608,026

TERPOLYMER HAVING ALIPHATIC POLYESTER, POLYSILOXANE AND POLYCARBONATE

CROSS-REFERENCE TO RELATED APPLICATIONS

This application is a continuation application of U.S. Ser. No. 07/724,018 filed Jul. 1, 1991, now abandoned.

BACKGROUND OF THE INVENTION

1. Field of the Invention

This invention relates to thermoplastic condensation polymers which are terpolymers having aliphatic polyester, polysiloxane and polycarbonate segments (blocks). These polymers exhibit advantageous melt flows, advantageous low temperature properties and resistance to solvents, chemicals, hydrolysis and to photodecomposition. The terpolymers are especially useful as engineering thermoplastics.

2. Brief Description of the Related Art

Condensation copolymers having polysiloxane and polycarbonate blocks are known. Representative of such polymers are those disclosed by Schmidt et al., U. S. Pat. No. 4,681,922 (July 1987), Vaughn, U.S. Pat. No. 3,189,662 (June 1965), Vaughn, U.S. Pat. No. 3,419,635 (Dec. 1968), and Merritt, U.S. Pat. No. 3,832,419 (Aug. 1974). Some of these copolymers, while useful, have slower than desired flow properties, requiring high torque or high molding pressures during processing. From the standpoint of ease of processing, it is desirable for a thermoplastic to have higher melt flow properties. This makes possible rapid and complete mold filling and is especially important for molding complex and thin-walled articles.

Other siloxane-carbonate copolymers, such as described by Vaughn, U.S. Pat. No. 3,419,635, have an elastomeric character and are not considered as engineering thermoplastics, being more useful as adhesives, coatings, sealants, roofing material, impact modifying additives and the like.

A shortcoming of other siloxane-carbonate polymers is inadequate impact strength at low temperatures.

Another property which needs improvement beyond the levels achieved with the prior art copolymers is solvent resistance, as manifested for instance by resistance to crazing upon exposure to solvents, motor fuels, and the like.

A shortcoming of certain other known polycarbonate-siloxane copolymers is the presence of an aryloxysilicon linkage, which is hydrolysisprone. Some other known polycarbonate-siloxane copolymers have aromatic acyloxyphenoxy linkages which are photolabile, causing discoloration on exposure to sunlight or fluorescent light (believed to be caused by the known photo-Fries rearrangement reaction).

The thermoplastics of the present invention exhibit advantageous low temperature impact strengths, melt flow solvent resistance, hydrolytic stablility and photo-stability.

An advantageous feature of the invention from a process standpoint is the formation of the block polymer in a convenient and novel one-step process which forms the aliphatic polyester and carbonate block and links it with the polysiloxane block. This is in contrast to processes for making block copolymers, where it is usually necessary to synthesize the individual blocks and to combine them in a separate step, thus imposing additional labor and time on the process.

SUMMARY OF THE INVENTION

The invention comprises a thermoplastic block terpolymer, which comprises;

(a) about 1 to about 30 % by weight of the terpolymer of a siloxane from recurring polysiloxane blocks of the formula:

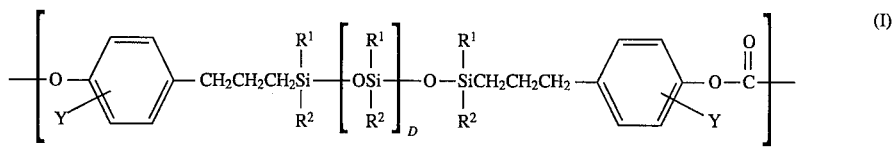

where $R^1$ and $R_2$ are each independently selected from hydrogen, hydrocarbyl, halogen-substituted hydrocarbyl ($R^1$ preferably is methyl and $R_2$ preferably is methyl or phenyl); D is an integer of from about 10 to about 120, preferably about 30–70, and more preferably 40–60; and Y is hydrogen, alkyl or alkoxy (and where alkoxy, preferably methoxy); and (b) about 70 to about 99% by weight of the terpolymer of a polycarbonate-aliphatic polyester condensation copolymer block consisting essentially of from about 80 to about 99% by weight, relative to the total weight of recurring units in (b), of polycarbonate units of the formula:

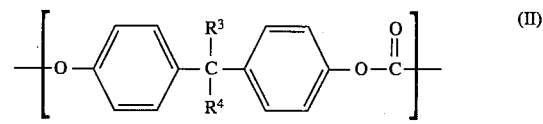

where $R^3$ and $R^4$ are each selected from hydrogen, hydrocarbyl or halogen-substituted hydrocarbyl, (preferably methyl); and from 1 to 20% by weight, relative to the total weight of the recurring units in (b), of aliphatic diester units of the formula:

where A is an alkylene moiety, preferably a primary alpha, omega-alkylene, of about 6 to about 18 carbon atoms.

The term "hydrocarbyl" as used herein means the monovalent moiety obtained upon removal of a hydrogen atom from a parent hydrocarbon. Representative of hydrocarbyl are alkyl of 1 to 25 carbon atoms, inclusive such as methyl, ethyl, propyl, butyl, pentyl, hexyl, heptyl, octyl, nonyl, undecyl, decyl, dodecyl, octadecyl, nonodecyl eicosyl, heneicosyl, docosyl, tricosyl, tetracosyl, pentacosyl and the isomeric forms thereof; aryl of 6 to 25 carbon atoms, inclusive, such as phenyl, tolyl, xylyl, napthyl, biphenyl, tetraphenyl and the like; aralkyl of 7 to 25 carbon atoms, inclusive, such as benzyl, phenethyl, phenpropyl, phenbutyl, phenhexyl, napthoctyl and the like; cycloalkyl of 3 to 8 carbon atoms, inclusive, such as cyclopropyl, cyclobutyl, cyclopentyl, cyclohexyl, cycloheptyl, cyclooctyl and the like.

The term "alkylene" means the divalent moiety obtained on removal of two hydrogen atoms, each from a non-adjacent carbon atom of a parent hydrocarbon and includes alkylene of 3 to 18 carbon atoms, inclusive, such as 1,3- propylene, 1,4-butylene, 1,5-pentylene, 1,8-octylene, 1,10-decylene and the like.

The term "halogen-substituted hydrocarbyl" as used herein means the hydrocarbyl moiety as previously defined wherein one or more hydrogen atoms have been replaced with a halogen atom.

The term "halogen" is embracive of chlorine, bromine, iodine and fluorine.

DETAILED DESCRIPTION OF THE INVENTION

The following description presents embodiment compositions of the invention and the manner and process of conducting the process of the invention.

The process of this invention comprises reacting a carbonate precursor such as phosgene simultaneously or consecutively with (1) a siloxane, terminated by phenolic hydroxyls, of the formula:

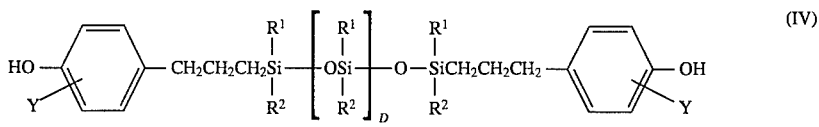

(IV)

where $R^1$, $R^2$, D and Y are as defined above, (2) a bisphenol of the formula:

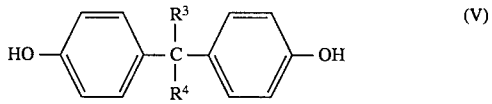

(V)

where $R^3$ and $R^4$ are as defined above; and (3) an aliphatic dicarboxylic acid having the formula:

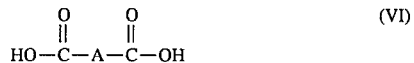

(VI)

where A is as defined above;
in the presence of sufficient aqueous alkali to maintain an alkaline pH and in the presence of a substantially water-immiscible solvent; the reactants (1), (2) and (3) being in the ratio required for the terpolymer structure described above.

The procedure is the well-known interfacial polymerization technique, used to prepare polycarbonate resins.

The method of preparation of polycarbonates by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

Although the reaction conditions of the preparative processes may vary, several of the preferred processes typically involve dissolving or dispersing the bisphenol (V) reactants in aqueous caustic soda or potash, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

A catalyst may be employed to accelerate the rate of polymerization of the dihydroxy reactants with the carbonate precursor. Representative catalysts include but are not limited to tertiary amines such as triethylamine, quaternary phosphonium compounds, quaternary ammonium compounds, and the like. The preferred process for preparing resins of the invention comprises the phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric reactants (IV) and (V) and the amount of dicarboxylic acid also present.

The process of the invention may be conducted without a chain limiting amount of a monohydric phenol chain stopper, but it is preferable that such an agent be present so that the molecular weight is controlled. Any monohydric phenol can be used, unsubstituted or with one or more substituents such as hydrocarbyl, hydrocarbyloxy or halogen, but the preferred monohydric phenol is phenol itself. The typical amount of monohydric phenol to result in the desired molecular weight (chain length) being in the desired range is about 0.5% to 5.0% by weight of bisphenol (V). The preferred end groups for the terpolymers of the invention are aryloxy groups, especially phenoxy, optionally substituted by one or more hydrocarbyl, hydrocarbyloxy, and/or halogen substituents. Preferred endcapping phenols are phenol, p-tertiary butyl phenol, p-cumyl phenol, and the like.

The terpolymers of the invention comprise recurring blocks of Formulae (I), (II) and (III) as set forth above.

Particularly preferred polysiloxane blocks (I) are made from bisphenolpolysiloxanes (IV), which may be prepared in accordance with the method described in U.S. Pat. No. 3,419,635. A preferred compound(IV) is readily provided by eugenol (2-methoxy-4-allylphenol) reacted to cap a hydrogen-terminated polysiloxane by an addition reaction advantageously catalysed by platinum or its compounds. The essential features of the capping process are described by Vaughn, U.S. Pat. No. 3,419,635 (December 1968), which is incorporated by reference. For instance, the process is exemplified in example 8 of this Vaughn patent which describes the addition of a hydrogen-terminated polydimethylsiloxane to allylphenol in the presence of a catalytic amount of platinum catalyst at an elevated temperature.

The bisphenol (V) for preparation of the polycarbonate block (b) (Formula (II)) will have the structure depicted above in Formula (V). Examples of preferred groups $R'$ and $R^4$ are hydrogen, methyl, ethyl, n-propyl, isopropyl, octyl, eicosyl, vinyl, cyclohexyl, phenyl, trifluoromethyl, chlorophenyl, benzyl, and pentabromophenyl. The most preferred $R_3$ and $R^4$ groups are methyl, thus the most preferred bisphenol (V) is bisphenol A. Representative of other bisphenol (V) are those listed in U.S. Pat. No. 4,994,532 (col. 3, lines 33–55) which is incorporated herein by reference thereto.

The aliphatic dicarboxylic acid of Formula (VI) may be straight or branched chain, saturated or unsaturated. For instance, the acid (VI) can be 2-octylsuccinic acid, dimethyladipic acid, or the like. However, the preferred aliphatic dicarboxylic acids are those with a linear, saturated aliphatic chain, for instance suberic, azelaic, sebacic, undecanedioic, dodecanedioic, brassylic, pentadecanedioic, hexadecanedioic, heptadecanedioic, octadecadioic, nonadecanedioic and eicosanedioic acids. It will be obvious to one skilled in the art that the acids (VI) may not be present in the reaction mixture as the free acids but as corresponding salts, formed by reaction with the requisite base, although they could also be added as preformed salts.

The amount of alkali to be used in the process of the invention is at least that amount needed to convert the dicarboxylic acid (VI) to its di salt and to neutralize the hydrochloric acid stoichiometrically produced by the reaction of the phosgene with the phenolic groups of the bisphenol (V) and the phenolically-terminated siloxane (IV), although an excess over this amount can be used. The alkali is conveniently an alkaline metal hydroxide, such as sodium, potassium or lithium hydroxide, although a soluble alkali carbonate can also be used. The preferred alkali is aqueous sodium hydroxide.

The process of the invention features the simultaneous formation and incorporation of the siloxane and aliphatic polyester-polycarbonate blocks into the terpolymer product.

The terpolymers of the invention may be compounded with the addition of various types of additives known to the art of plastics compounding. Such additives can include for example fillers (such as clay or talc), reinforcing agents (such as glass fibers), impact modifiers, other resins, antistats, plasticizers, flow promoters and other processing aids, stabilizers, colorants, mold release agents, other flame retardants, ultraviolet screening agents, and the like. The thermoplastic of the invention can also be blended with other resins such as ABS and thermoplastic polyesters to produce useful thermoplastic blends.

The invention will be better understood with reference to the following examples, which are presented for purposes of illustration rather than for limitation, and set forth the best mode contemplated for carrying out the invention.

Preparation 1

Representative preparation of eugenol capped polydimethylsiloxane fluid: Octamethylcyclotetrasiloxane (8.3 kg, 28.0 moles), tetramethyldisiloxane (330 g, 2.46 moles) and Filtrol 20 (86 g, 1% by weight, Harshaw/Filtrol Clay Products) were combined in a 12 L flask and heated to 45° C. for 2 hours. The temperature was raised to 100° C. and the mixture was rapidly agitated for 5 hours. The mixture was allowed to cool then filtered through a plug of Celite filtering aid. To the crude product was added a mixture of eugenol (774 g, 4.72 moles) and Karstedt's platinum catalyst (1.57 g, 10 ppm Pt) at a rate of 40 g/minute. Reaction completion was monitored by the disappearance of the siloxane hydrogen in the FTIR spectrum. The reaction product was stripped of volatiles using a falling thin film evaporator operating at 200° C. and 1.5 torr. The isolated material was a light brown oil with a viscosity of 100 cstokes at 25° C. and a degree of polymerization of 49 siloxane units. The material was used without further purification.

Preparation 2

Representative preparation of the terpolymer compositions of the invention: Dodecanedioic acid (916 g, 39.8 moles) was dissolved in 50% aqueous sodium hydroxide solution (5 L) and combined with bisphenol-A (9.07 kg, 39.8 moles), phenol (94.0 g, 0.958 mole), triethylamine (115 mL) and sodium gluconate (15 g) in dichloromethane (35 L) and water (30 L). The pH of the mixture was brought to 8.0 by the addition of 50% aqueous sodium hydroxide solution. Phosgene was introduced into the rapidly agitated and recirculating reaction mixture at a rate of 260 g/minute. The pH was maintained between 8.0 and 8.5 for the first half of the reaction. After 50% of the phosgene had been introduced the pH was increased to 10.0. The eugenol capped polydimethylsiloxane D49 fluid prepared according to the method of Preparation 1, supra. (600 g, 0.152 mole, 5 weight percent) was introduced all at once to the reaction mixture as a solution in dichloromethane (2 L) after 50% of the phosgene had been introduced. The pH of the reaction mixture was maintained between 10.0 and 10.5 until the remainder of the phosgene was added (5.2 kg, 52.5 moles, total). After purging the reaction mixture with nitrogen, additional dichloromethane (20 L) was added and the organic phase was separated from the brine layer by liquid/liquid centrifugation. The organic phase was worked up by washing with 1% aqueous hydrochloric acid solution and water by means of phase to phase contact followed by liquid/liquid centrifuge separation. The resin was isolated as white granules (9.98 kg) by steam precipitation from the dichloromethane solution. The material was characterized by standard analytical methods: Tg 123 C; IV 0.61 g/dL; Gel Permeation Chromatography (polystyrene standard using a K factor to polycarbonate molecular weights) Mw 35110, Mn 14111, Disp 2.49; Siloxane content by 1H NMR was 5 weight percent; Aliphatic diester content by 1H NMR was 10 weight percent.

Preparation 3

For the purpose of having a control composition, a polysiloxane copolymer without the aliphatic diester component was prepared using a similar interfacial reaction procedure. Bisphenol-A (9.07 kg, 39.8 moles), the D49 eugenol capped polydimethylsiloxane fluid (600 g, 0.152 moles, 5 percent by weight siloxane), triethylamine (115 mL), phenol (94.0 g, 0.958 mole) and sodium gluconate (15.0 g) were combined with water (30 L) and dichloromethane (35 L). The biphasic mixture was stirred vigorously and brought to pH 10 by the addition of 50% aqueous sodium hydroxide solution. Phosgene (4.53 kg, 45.8 moles) was added over the course of 30 minutes with the reaction pH maintained in the range of 10.0 to 10.5. After purging the reaction mixture with nitrogen, additional dichloromethane (20 L) was added and the organic phase was separated from the brine layer by liquid/liquid centrifugation. The organic phase was worked up by washing with 1% aqueous hydrochloric acid solution and water by means of phase to phase contact followed by liquid/liquid centrifuge separation. The resin was isolated as white granules (9.07 kg) by steam precipitation from the dichloromethane solution. The material was characterized by standard analytical methods: Tg 149° C.; IV 0.55 dL/g; Gel Permeation Chromatography (polystyrene standard using a K factor to polycarbonate molecular weights) Mw 34723, Mn 15538, Disp 2.23. Siloxane content by 1H NMR was 5 wt %.

Preparation 4

For the purpose of having a control composition, an aliphatic diester copolycarbonate was prepared in accordance with Fontana, et. al. in U.S. Pat. No. 4,983,706. Materials were compounded with a phosphite stabilizer (0.05 wt. %) and tumbled in a stainless steel can prior to extrusion on a Werner and Pfleiderer 30 mm co-rotating twin screw extruder operating at 500° to 600° F. barrel temperatures. Test specimens were prepared by injection molding at 570° to 600° F. melt temperature and 180° F. mold temperature. Notched IZOD impact of single gated bars and unnotched IZOD impact of double gated bars were determined according to ASTM D-256. Flexural yield and flexural modulus were determined according to ASTM D-790. Tensile yield, tensile break and tensile elongation were determined according to ASTM D-638. Melt flow rating was determined by modified ASTM D-1238. Ignition resistance was determined by UL94 test. Rheological comparison of the terpolymer of the invention with the siloxane copolymer control was made at 300° C.

| Property | Control | Terpolymer of Invention |
| --- | --- | --- |
| Wt % siloxane | 5 | 5 |
| Siloxane degree of polymerization | 49 | 49 |
| Wt % aliphatic diester | 0 | 10 |
| Mw | 34723 | 35110 |
| Melt flow rating | 2 | 5 |
| Viscosity at 500 sec-1 (Pa-sec) | 1000 | 590 |
| Viscosity at 1000 sec-1 | 700 | 450 |

| Property | Control | Terpolymer of Invention |
|---|---|---|
| (Pa-sec) | | |
| Viscosity at 3000 sec-1 (Pa-sec) | 300 | 200 |

These results show the processing advantages of the terpiolymer of the invention where for a similar molecular weight the terpolymer of the invention has lower melt viscosity and higher melt flow.

EXAMPLE 1.

A control composition, 1, was prepared from LEXAN 15 grade polycarbonate resin (General Electric Company, Mount Vernon, Ind.) and appropriate stabilizers. A composition of the present invention, 2, was also prepared as described above, with appropriate stabilizers. The materials were compounded, extruded and molded as described above and found to have the following properties.

| Property | Control 1 | Terpolymer of Invention 2 |
|---|---|---|
| Wt % siloxane | 0 | 5 |
| Siloxane degree of polymerization | — | 49 |
| Wt % aliphatic diester | 0 | 10 |
| Melt flow rating (g/10 min) | 6 | 5.5 |
| 125 mil notched IZOD (ft-lbs/in) | 16* | 18* |
| 125 mil notched IZOD @ −50° C. | 3† | 15* |
| 250 mil notched IZOD (ft-lbs/in) | 3† | 16* |
| 250 mil notched IZOD @ −40° C. | — | 9* |
| craze resistance to acetone[1] (sec) | <5 (broke) | >1000 |
| craze resistance to diacetone alcohol[1] (sec) | <5 (broke) | 73 |

*indicates ductile failure;
†indicates brittle failure
[1]Time to initial craze formation after exposing a 125 mil thickness bar in a 3400 psi constant radius strain jig to solvent.

These data show the superior impact performance and chemical resistance of the terpolymer of the invention.

EXAMPLE 2.

A control composition, 3, was prepared: 90 parts LEXAN 100 grade polycarbonate resin, (supra.), 10 parts chopped glass fibers (Owens Corning Fiberglass 415), 2.0 parts TIONA RCL-69 titanium dioxide (made by SCM) and appropriate stabilizers. A control composition, 4, was also prepared: 90 parts polyestercarbonate resin (prepared in accordance with Fontana, et. al. in U.S. Pat. No. 4,983,706 using 10 weight percent dodecanedioic acid), 10 parts chopped glass fibers (Owens Corning Fiberglass 415), 2.0 parts TIONA RCL-69 titanium dioxide (made by SCM) and appropriate stabilizers. A composition of the present invention, 5, was also prepared: 90 parts of a terpolycarbonate (of bisphenol-A, eugenol capped polydimethylsiloxane with a degree of polymerization of 49 at 5 weight percent siloxane loading and dodecanedioic acid at 10 weight percent loading), 10 parts chopped glass fibers (Owens Corning Fiberglass 415), 2.0 parts TIONA RCL-69 titanium dioxide (made by SCM) and appropriate stabilizers. The materials were compounded, extruded and molded as described above and found to have the following properties.

| Property | Control 3 | Control 4 | Composition of Invention 5 |
|---|---|---|---|
| Wt % siloxane | 0 | 0 | 5 |
| Siloxane degree of polymerization | — | — | 49 |
| Wt % aliphatic diester | 0 | 10 | 10 |
| Melt flow rating (g/10 min) | 4.5 | 7 | 5 |
| Tensile @ break (psi) | 7100 | 6400 | 6100 |
| Tensile @ yield (psi) | 8600 | 8700 | 7900 |
| Tensile elongation (%) | 18 | 15 | 11 |
| Flex modulus (psi) | 389100 | 398500 | 407800 |
| Flex yield (psi) | 13700 | 13400 | 12700 |
| 125 mil double gated IZOD (ft-lbs/in) | 17† | 11† | 9* |
| 125 mil notched IZOD (ft-lbs/in) | 2† | 1† | 4* |
| 250 mil notched IZOD (ft-lbs/in) | 2† | 1† | 3* |

†indicates brittle failure;
*indicates ductile failure
These data indicate the superior impact performance of the terpolymer of the invention.

What is claimed is:

1. A thermoplastic block terpolymer, which comprises:
   (a) about 1 to about 30% by weight of the terpolymer of a siloxane from recurring polysiloxane blocks of the formula:

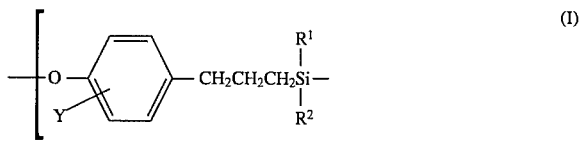

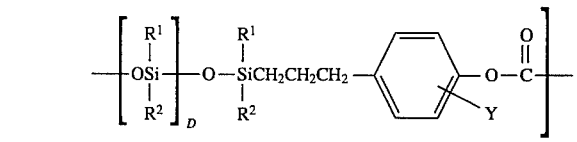

where $R^1$ and $R_2$ are each independently selected from hydrogen, hydrocarbyl, or halogen-substituted hydrocarbyl; D is an integer of from about 10 to about 120; and Y is hydrogen, alkyl or alkoxy; and (b) about 70 to about 99% by weight of the terpolymer of a polycarbonate-aliphatic polyester condensation copolymer block consisting essentially of from about 80 to about 99% by weight, relative to the total weight of recurring units in (b), of polycarbonate units of the formula:

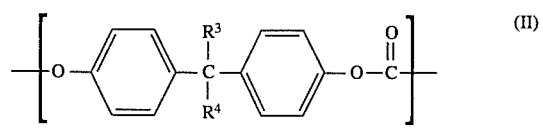

where $R_3$ and $R_4$ are each selected from hydrogen, hydrocarbyl or halogen-substituted hydrocarbyl; and from 1 to 20% by weight, relative to the total weight of the recurring units in (b), of aliphatic diester units of the formula:

where A is an alkylene moiety, of about 6 to about 18 carbon atoms.

2. The terpolymer of claim 1 wherein $R^1$ and $R^2$ are methyl.

3. The terpolymer of claim 1 wherein $R^3$ and $R_4$ are methyl.

4. The terpolymer of claim 1 wherein D is about 40–60.

5. The terpolymer of claim 1 wherein D is 50.

6. The terpolymer of claim 1 wherein Y is methoxy.

7. A process for the production of a block terpolymer which comprises introducing phosgene into a stirred two phase mixture comprising:

(1) a siloxane, terminated by phenolic hydroxyls, of the structure:

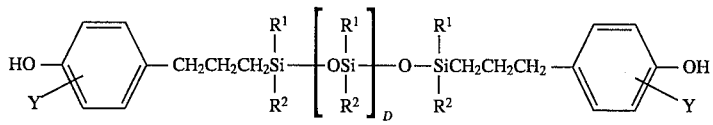

where $R^1$ and $R^2$ are selected from hydrogen, hydrocarbyl or halogen-substituted hydrocarbyl; where D is an integer of from about 10 to about 120; and Y is selected from hydrogen, hydrocarbyl, halogen-substituted hydrocarbyl and alkoxy, (2) a bisphenol, of the structure:

where $R^3$ and $R^4$ are selected from hydrogen, hydrocarbyl and halogen-substituted hydrocarbyl; and (3) an aliphatic dicarboxylic acid having the structure

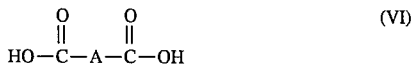

where A is an alkylene of about 6 to about 18 carbon atoms, in the presence of sufficient aqueous alkali to maintain an alkaline pH and in the presence of a substantially water-immiscible solvent; and in the presence of (4) from about 0.5 to 5.0 percent by weight of the bisphenol (V) of a monohydric phenol.

8. The process of claim 7 wherein $R^1$, $R^2$, $R^3$ and $R^4$ are methyl and Y is methoxy.

9. The process of claim 8 wherein D is from 40 to 60.

* * * * *